C. H. GENTH.
ELASTIC TIRE FOR WHEELS.
APPLICATION FILED OCT. 18, 1909.
1,045,543.
Patented Nov. 26, 1912.
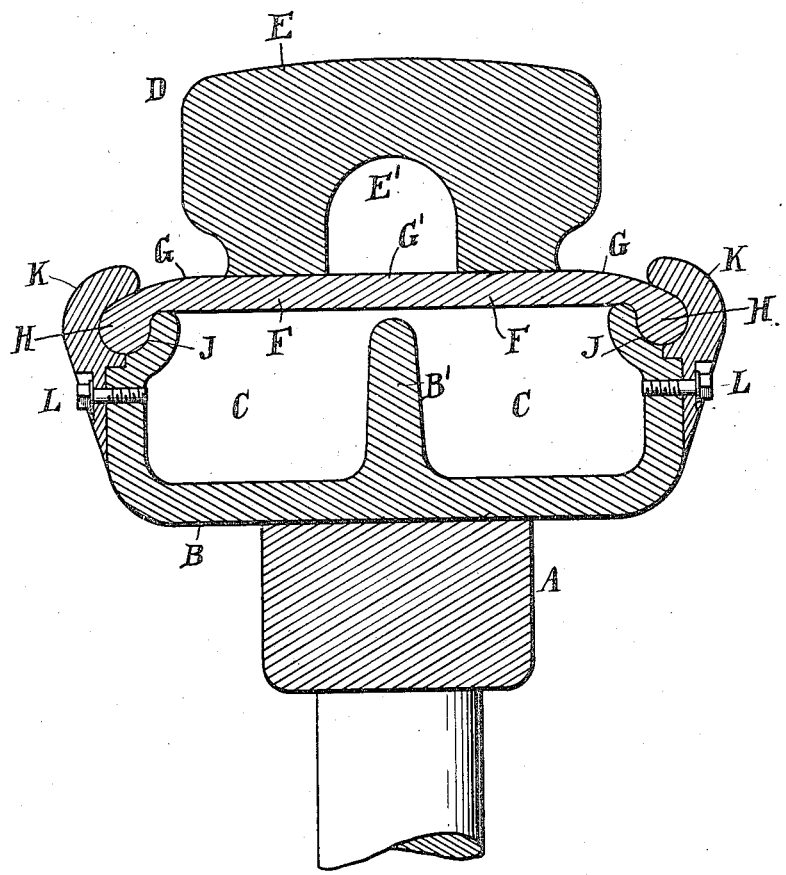
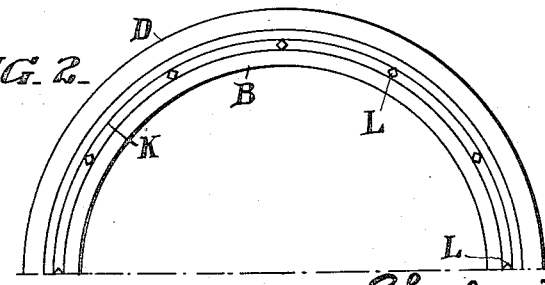

UNITED STATES PATENT OFFICE.

CHARLES H. GENTH, OF PHILADELPHIA, PENNSYLVANIA.

ELASTIC TIRE FOR WHEELS.

1,045,543. Specification of Letters Patent. Patented Nov. 26, 1912.

Application filed October 18, 1909. Serial No. 523,232.

*To all whom it may concern:*

Be it known that I, CHARLES H. GENTH, a citizen of the United States, and a resident of the city and county of Philadelphia, State of Pennsylvania, have invented an Improvement in Elastic Tires for Wheels, of which the following is a specification.

My invention has reference to elastic tires for wheels and consists of certain improvements which are fully set forth in the following specification and shown in the accompanying drawings which form a part thereof.

The object of my invention is to provide a simple and inexpensive construction of elastic tire, especially adapted for automobiles, and embodying a construction which may be easily repaired.

My invention consists in features of construction which are described hereinafter and specifically defined in the claims; and these improvements will be better understood by reference to the drawings, in which:

Figure 1 is a cross section through a wheel tire embodying my invention; and Fig. 2 is a side elevation on a smaller scale of one-half of the tire portion removed from the wooden wheel center.

A is the felly of the wooden wheel to which my improved tire is applied. The wheel proper may be of wood or metal and of any construction desired. Surrounding the perimeter of the wooden felly A is a metallic rim B having an annular rib B' to provide annular channels or chambers C. Secured to the outer edges of the sides of the rim B and inclosing the chamber C is the rubber tire portion D. More specifically, this rubber tire portion D comprises the annular shoe E of hard rubber composition such as commonly used for shoes or pneumatic tires in general use, and a lower or elastic body portion F having lateral annular flanges G and middle part G' of elastic rubber, constituting a band the lateral edges of which are clamped firmly to the sides of the channel tire B with the middle part over the rib B', and thereby imparts great elasticity in the support of the shoe or tread portion E.

As shown, the width of the shoe E is less that the interior width of the chamber C and is recessed on its sides adjacent to the body portion F to increase the available width of the elastic flanges G. The shoe E is also recessed on its inner face as at E', said recess being in annular form and arranged over the central rib B' of the rim and over the portion G' of the elastic web which is interposed between the recess E' on the shoe and the said rib B' of the rim. This construction provides an annular air chamber in the tire as a whole, the outer portion of which is formed by the sides and tread portion of the shoe of comparatively hard rubber and the inner portion bounded by the elastic web portion G' which may be forced inwardly to compress the air when the shoe is pressed toward the rib B' in action. The flanges G are preferably tapered in cross section and terminate in beaded edges H. The shoe or tread portion E may be provided with fabric and rubber layers on edge to prevent skidding or be otherwise formed to increase the resistance to wear. The beaded edges H of the elastic flanges G are received in grooves J in the outer edges of the sides of the channel tire B and are clamped therein by annular clamping rings K, held in place by screws L. The edges P and R of the sides of the channel tire and clamping rings, respectively, are rounded as shown to form smooth curved surfaces over which the rubber flanges G may bend when in use. The rings K may be in one piece or in sections as desired.

While the elastic flanges G and portions G' are mainly relied upon for permitting the proper movement of the shoe or tread E, I prefer to connect these parts by body portions F of elastic rubber made integral with the said portions so that the elasticity of the rubber part of body F may assist the flanges G in yieldingly sustaining the shoe or tread portion E.

The chambers or channels C may contain air at atmospheric pressure, except so far as it is partly compressed by the depression of the shoe E and the body F into the chambers or channels under the load of the vehicle; but the channel tire may be provided with an air valve of usual construction through which to force compressed air with the object of increasing the pneumatic effect, and this would be especially useful in the case of heavy vehicles.

In the operation of my improved tire there is no great elasticity required of the shoe portion E and said portion only moves radially while bending at place of contact with the road. The shifting of the shoe portion E is permitted by the yielding character of the elastic flanges G, said flanges not only being flexible about their points of attachment with the rim but adapted to stretch when the shoe portion E is forced into the chambers or channels C C. The air in the chambers C C may be compressed to a greater or less extent and assists the elastic rubber parts in sustaining the pressure of the shoe portion E by pneumatic action.

In the particular form of my invention as shown in Fig. 1 I provide the channel tire B with a central annular rib B', which may be of slightly less height than the sides, and I also provide the shoe or tread portion E with an annular air chamber E' adjacent to the very elastic rubber body F so that a portion of said body forms a thick elastic band G' as an inclosing wall for one side of the air chamber E'. Moreover, this part G' and air chamber E' comes in line with the rib B', so that, when pressure is put upon the shoe, the elastic part G' is pressed into contact with the rib and in this way provides two additional points of stretching and imparting approximately twice the sustaining power to what it would have been without the presence of the annular rib B'.

It will be readily understood that in case of injury to the flanges G by puncturing, the elasticity of the rubber will still perform its function. Should the injury require the replacement of the rubber portion of the tire, this may easily be done by loosening or removing the ring portions K with very little labor and loss of time. The metallic parts of the tire may be of cast, rolled, or stamped sheet metal, as desired. It is to be understood that the tread portion E and the elastic portion F, G, G, are positively secured together.

I have shown my invention in the form which I prefer, but I do not restrict myself to the details, as these may be modified without departing from the spirit of my invention.

Having now described my invention what I claim as new and desire to secure by Letters Patent, is:

1. As an article of manufacture, a rubber tire for a wheel comprising an integral annular structure of rubber having an air chamber part arranged annularly in the tire and hermetically sealed against escape of or inflow of air, the sides and tread portion about the outer portion of the air chamber part formed of comparatively hard rubber of relatively small elasticity and the inner annular portion of said tire bounding and forming the inner annular wall of the air chamber formed of relatively elastic rubber and provided with laterally projecting elastic side annular flanges integral with the sides of the tread portion.

2. In a wheel tire, the combination of a metallic rim made channel shape in cross section and having an annular middle flange dividing it into a plurality of annular grooved parts an annular band of elastic rubber surrounding the metallic rim and having its lateral edges secured to the edges of the sides of the metallic rim and its middle normally out of contact with the middle flange, clamping means whereby the edges of the elastic band are secured to the metallic rim, and an annular shoe of relatively inelastic rubber secured to the band of elastic rubber above the annular grooves in the metallic rim.

In testimony of which invention, I hereunto set my hand.

CHARLES H. GENTH.

Witnesses:
 JOHN A. ZOELLS,
 JULIAN B. CARTER.